Jan. 15, 1935.　　　G. A. SCHETTLER　　　1,987,805

AREA MEASURING MACHINE

Filed June 24, 1932

INVENTOR
Gustav A. Schettler
By his Attorney
Harlow M. Davis

Patented Jan. 15, 1935

1,987,805

UNITED STATES PATENT OFFICE 1,987,805

AREA MEASURING MACHINE

Gustav Adolf Schettler, Leeds, England, assignor to The Turner Tanning Machinery Company, Portland, Maine, a corporation of Maine Application June 24, 1932, Serial No. 619,096
In Great Britain July 6, 1931

2 Claims. (Cl. 33—124)

This invention relates to devices for transmitting movement from one part or element of a mechanism or machine to another. While the invention is illustrated as embodied in a machine for measuring the area of sheets of material, such for example as hides, skins or leather pieces, it is to be understood that the invention and various important features thereof may have other applications and uses.

In area measuring machines, as heretofore constructed, it has been common to provide toothed or gear members to transmit the movement of totalizing mechanism to area indicating means. Such toothed or gear members are open to the disadvantages of permitting lost motion and a certain amount of backlash with the result that discrepancies occur between the actual movement of the totalizing mechanism and the indication given on the indicator in measuring operations upon pieces of work. Where springs or weighted devices are used in an effort to prevent the lost motion and backlash referred to above, there is still the possibility of securing inaccurate results due to wear of the parts and to variations in spring tension, particularly where the effective length of a spring changes in the winding thereof about one of its attached ends. Even in the case of a weighted cord or cable employed in the transmission of movement from one part to another, the length of the effective leverage varies with the winding of the cable or cord to which the weight is attached, whereby variation in the operation of the parts may occur.

It is an object of the invention to obviate the deficiencies or defects of prior constructions with the end in view of securing accurate transmission of movement from one moving part or element to another in a machine wherein delicacy and accuracy in the parts and in the movements thereof are required as in area measuring machines for use in measurements upon hides and skins. It is a further object of the invention to secure the desired results by means of a simple yet durable construction, and one highly efficient for the purpose intended.

To these ends and in accordance with an important feature of the invention there is provided in an arrangement for securing accurate movement of a rotary indicator member from a reciprocatory or oscillatory member responsive to work qualities or characteristics, a pair of bands or ribbons arranged to connect the rotary indicator member and the reciprocatory or oscillatory member and to transmit motion from one to the other in an arrangement wherein the bands are each secured fixedly at one end to the reciprocatory or oscillatory member and extend in opposite directions to engage the rotary member, spring means being provided to connect the other ends of the bands to the reciprocatory or oscillatory member. By this arrangement there is a positive nonyielding pull exerted on the rotary indicator member by the reciprocatory or oscillatory member to rotate the rotary member in both directions, whereby uniformity in the movements of the rotary member is secured. Preferably also the two members connected by the bands are spaced from each other a distance corresponding closely to the thickness of the bands or ribbons. This arrangement is compact and has the advantage of reducing, to a minimum, friction in the bearings of the rotary member due to traction thereon by the bands in the direction directly toward the reciprocatory or oscillatory member.

These and other important features of the invention and novel combinations of parts will now be described in detail in the specification and then pointed out more particularly in the appended claims.

Figure 1:
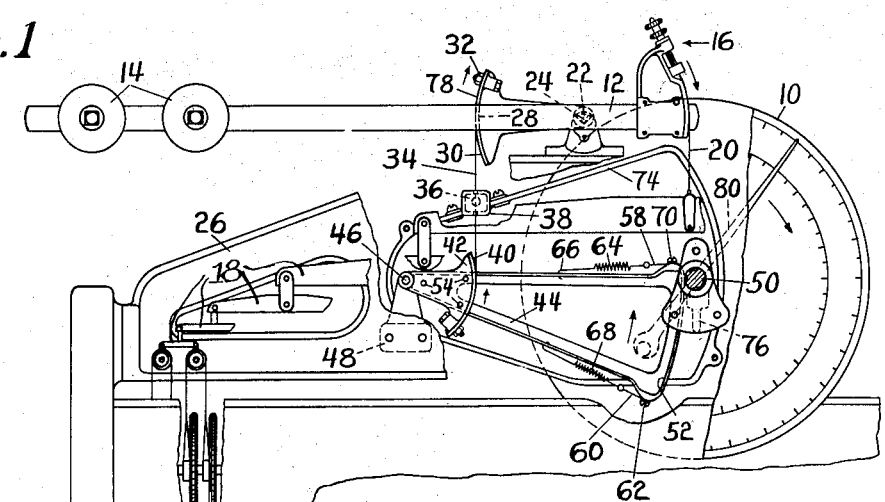
Figure 1 is a front elevation partly in section of an area measuring machine of the pinwheel type illustrating one embodiment of the invention.
Figure 4:
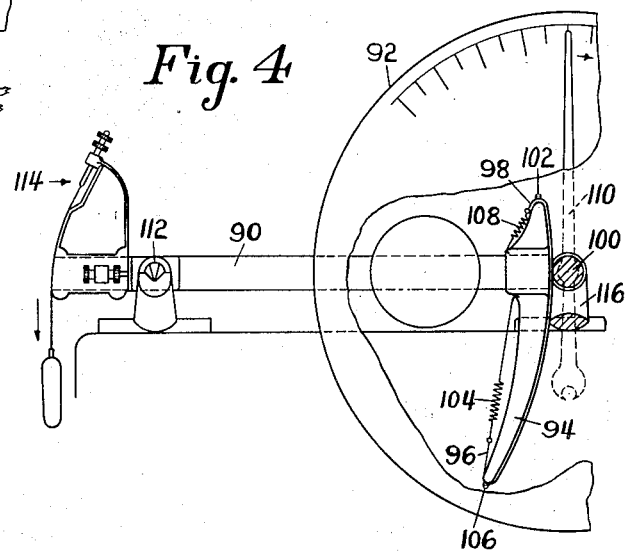
Fig. 4 is a front elevation of an arrangement wherein the transmission is effected directly by an index bar or lever.
Figure 2:
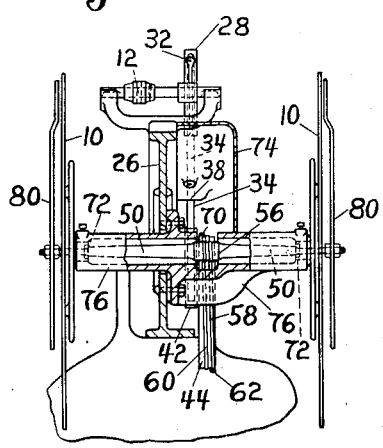
Fig. 2 is a sectional view taken along the line II—II of Fig. 1.
Figure 3:
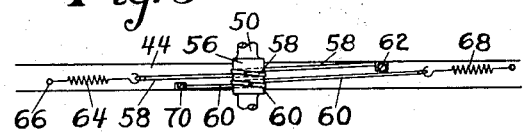
Fig. 3 is a developed view of the motion transmitting bands and the segment to which they are anchored, to show clearly the arrangement of the bands and their anchorages.

Figures 1 to 3, inclusive, are drawn to a smaller scale than Figure 4.

In Figures 1 and 4 the dial and pointer of the machine are represented by dot and dash lines so as to enable the essential parts of the mechanisms to be more clearly shown.

In the illustrated machine which is specially designed for measuring the area of pieces of leather, there is provided a centrally disposed dial 10, represented by dot and dash lines, arranged to be operated by an index bar or lever 12 which is shorter than usual and arranged to carry the usual balance weights 14 and the regulator 16 to which is adjustably attached the totalizing or integrating system of levers, shown in part at 18 (Fig. 1) of an area measuring machine. The attaching means comprises a steel band 20. Conveniently, the bar or lever 12 is mounted on a fulcrum which is constituted by hardened knife edges 22 supported in hardened sockets 24 suitably mounted on the upper part of the machine frame 26. Rigidly attached to lever 12 is a sector or segment 28 which has an arc 30 machined and ground to fine limits. As shown, this sector 28 extends in the same direction as and parallel to the index bar or lever 12 and has securely attached thereto at the upper end of the arc 30, by means of a clamp screw 32, a steel band or tape 34 which, after being passed through a felt packing 36 in a two-part box 38 or like holder, is attached to the lower end of arc or periphery 40 of another sector 42 similar to the first but oppositely arranged. The purpose of the felt packing is to prevent dust from accumulating on the lower sector. This lower sector 42 forms a part of a magnifying mechanism including a larger or main sector 44 pivoted on a pin 46 carried by a bracket 48 attached to the machine frame 26 with the said pivot pin 46 in horizontal alinement with and parallel to a dial spindle 50 (Fig. 1) of the dial 10 so that the main sector 44 extends in a horizontal direction toward the dial spindle 50. The main sector 44 also has an arc or periphery 52 machined and ground to fine limits and has the lower auxiliary sector 42 rigidly attached to it by means of screws 54 or equivalent means. The main sector 44 operates in conjunction with the dial spindle 50 which is provided with an enlarged cylindrical section or drum 56 (Fig. 3) also machined and ground to the required diameter within fine limits. The face of the arc of the sector 44 and the periphery of the drum 56 bear somewhat the same relation to each other as the pitch line and circle respectively of a toothed segment and pinion without, however, touching each other.

In accordance with a main feature of the invention, instead of providing a pinion or teeth on the dial spindle 50 and teeth on the main sector 44, there are provided steel bands or tapes 58 and 60 each of which is wound helically, i. e. coiled once round the drum 56 (Fig. 3) of the dial spindle 50. As shown, the portions of each band or tape 58 or 60 which remain after said band or tape has been wound once round the spindle extend from the drum tangentially in opposite directions. As will be understood the pitch of the coil is slightly greater than the width of the steel band or tape in order to obtain the required clearance between one portion of the band or tape and the other where said portions respectively pass on to and leave the drum 56 tangentially. As clearly shown in Figure 3, from the drum 56 one portion of the band or tape 58 extends along the face of the arc of the sector 44 and has its end securely attached to the main sector 44 by means of a clamping screw 62 on one side of the pivotal axis of the sector. The other portion of the steel band 58 which is taken in the opposite direction over the arc has its end attached to one end of a tension spring 64, the other end of which is engaged with or attached to the sector on the other side of the pivotal axis, i. e., at 66, for the purpose already alluded to herein. Each portion of the band or tape extends from the drum and over the arc of the sector at an angle corresponding to the angle of the thread of a screw having the same pitch as the coil aforesaid. In order to obtain a positive movement of the dial spindle 50 in both directions, as already explained herein, the second steel band or tape 60 is arranged in a similar way with the exception however that, as shown in Figure 3, the positions of the rigid and spring anchorages are reversed with respect to the corresponding anchorages of the other band or tape 58, that is, the second band or tape 60 has its spring anchorage 68 on the same side of the sector as the rigid anchorage 62 of the other band or tape 58. The fixed end of tape 60 is secured by screw 70. The main sector 44 is placed with the ground face of its arc or periphery contiguous to the periphery of the cylindrical section or drum 56, i. e., in such close relation thereto as just to allow the steel bands or tapes 58, 60 to pass between the opposing surfaces so that there is not any pressure on the dial spindle bearings 72 (Fig. 2). A dust cover 74 is provided for the main sector 44 and associated parts as shown.

The dial spindle bearings are formed or provided in a bracket 76 (Fig. 2) which is attached to the frame of the machine preferably centrally although it may be located in any other suitable position.

The construction and arrangement just described with reference to Figs. 1 to 3, inclusive, is such that when during the measurement of the area of a piece of sheet material, such as leather, the regulator end of the index bar or lever 12 is pulled down, (e. g., in the manner described in United States Letters Patent No. 1,046,655, granted Dec. 10, 1912, to G. A. Schettler) and the other end of the bar is raised, i. e., moved in the direction of the arrow 78, the sector 28 operates through the steel band 34 and the sector 42 to raise the main sector 44 which thereupon operates through the steel bands 58 and 60 to revolve the dial spindle 50, the said bands being, of course, coiled round the spindle in contact therewith, as shown, and tensioned sufficiently to achieve the desired result without slipping. As will be observed, the radius of the sector 44 is considerably greater than that of the sector 42, so that any movement of the index bar or lever 12 during a measuring operation causes a much greater movement of the arc of the sector 44 and a corresponding turning movement of the dial spindle 50 and of a dial pointer 80 (Fig. 1), so that as the result of this magnification the slightest movement of the bar 12 is indicated by the dial pointer 80. In Fig. 1 the sector 44 is represented as just commencing its upward movement to turn the dial spindle 50 and consequently the dial pointer 80 in a clockwise direction, the dial 10 being graduated accordingly.

The main sector 44 serves a dual purpose. First, it transmits the movement of the totalizing mechanism to the dial pointer 80 at the correct ratio as aforesaid, and, secondly, it acts as balance weight to tension the steel band or tape connection 34 between the auxiliary sectors 28 and 42 and to return the indicator or pointer 80 to zero position when the machine is restored to the normal condition after a measuring operation.

Figure 4 illustrates the application of the aforesaid embodiment of the invention directly to the index bar or lever 90 of an existing area measuring machine of the pinwheel type wherein a dial 92 or each dial 92, if front and back dials are provided, is located at one end of the said bar or lever 90. The lever 90 has attached thereto a sector or segment 94, and steel bands or tapes 96, 98 are wound helically round the drum portion of a dial spindle 100 and anchored at opposite ends to the sector or segment 94 by means of rigid and spring anchorages 102 and 104, respectively, for the tape 96, and anchorages 106 and 108, respectively, for tape 98, substantially in the manner described with reference to Figs. 1 to 3, inclusive.

As shown in Fig. 4, in a machine wherein a dial pointer or the front pointer 110, as the case may be, is to turn in a clockwise direction from the zero position, the bar or lever 90 is provided with a fulcrum 112 located between the usual regulator 114, and the segment or sector 94, and the latter is attached to the bar or lever 90 so that in the main it extends downwardly therefrom. Conveniently, the pointer spindle 100 is supported by a bracket 116.

On account of the extreme magnification of the movement between the regulator 16 (Fig. 1) or 114 (Fig. 4) and the end of the dial pointer, 80 or 110, extreme accuracy is required, and from a commercial standpoint it is more practical to produce plain sectors such as that at 52 than grooved sectors, although grooved sectors could be used for the purpose of this invention in conjunction with thin steel wires in place of steel bands or tapes 58 and 60.

The particular mechanical movement or motion transmitting mechanism herein described eliminates all pressure or tension on the dial spindle bearings, for instance at 72 (Fig. 2) and enables the dial spindle, 80 (Fig. 1) or 110 (Fig. 4) to be driven freely without any possibility of slip or backlash. Any slight error which may have developed in the machining of the various sectors can be compensated for by means of the regulator 16 or 114 which is movably mounted and adjustable by a micrometer screw on the index bar or lever 12 or 90 in the usual manner.

Having described my invention, what I claim as new and desire to secure by Letters Patent of United States is:

1. In a machine for measuring a dimension of a piece of work, a rotary member, an indicator member carried by said rotary member, an oscillatory member, a pair of flexible members wound about the rotary member and each having an end fixedly and unyieldingly attached to the oscillatory member to transmit rotary movements positively in opposite directions to said rotary member from said oscillatory member, said flexible members being arranged to extend in opposite directions from their fixed ends, and springs to connect the other ends of the flexible members to said oscillatory member.

2. In an area measuring machine, indicating means comprising a rotary member carrying an indicator member, a lever having a sector at one end thereof, a totalizing mechanism operated by a piece of work being measured and having a connection with said lever, and a pair of flexible metallic bands each fixedly and unyieldingly attached at one end to said sector, said bands extending in opposite directions and arranged to engage helically said rotary member to transmit rotary movements positively in opposite directions to said rotary member from said sector, and spring means to attach each of the other ends of said bands to said sector, whereby said rotary member is connected to the lever to be operated positively thereby with the result that the indicator member carried by the rotary member is rendered accurately responsive to movements of the totalizing mechanism.

GUSTAV ADOLF SCHETTLER.